United States Patent Office 3,268,463
Patented August 23, 1966

3,268,463
STRIPPABLE COATINGS COMPRISING ETHYL-
ENE-VINYL ACETATE COPOLYMER, ASPHALT
AND RELEASE AGENT
Homer C. McAninch and Richard F. Lippoldt, Ponca
City, Okla., assignors to Continental Oil Company,
Ponca City, Okla., a corporation of Oklahoma
No Drawing. Filed July 31, 1963, Ser. No. 299,092
15 Claims. (Cl. 260—23)

This invention relates to asphaltic base compositions, which may be applied to metallic surfaces for the protection thereof against corrosion. More particularly, but not by way of limitation, the present invention relates to asphaltic base compositions which may be applied as a protective coating to a metallic surface, which coating may subsequently be easily stripped from the metallic surface when it is desired to expose such surface.

It is frequently desirable to provide a film or coating upon various metallic surfaces to shield the surface from contact with moisture, corrosive fluids or other deleterious materials for a temporary period of time. It is also often desirable to provide some type of protective coating upon painted metallic surfaces to prevent such surfaces from being scratched or chipped during transportation or handling. To mention but a few specific instances where temporary protective coatings of the type described may be usefully employed, the shipment and installation of polished metal machine parts may be mentioned, in addition to the protection of machinery and apparatus from exposure to salt spray during the transport thereof on the open deck of a vessel. It is also frequently the case that farm machinery will be left standing in an exposed position at the edge of a field or cultivated land between periods of use and thereby become exposed to dust, rain, etc. In all of these situations, the great value of a readily removable protective coating which may be applied to the metallic surfaces during such periods of nonuse and exposure will be readily apparent.

Heretofore, a number of compositions have been proposed for providing such films or coatings upon exposed metal surfaces. Among such materials, those which depend upon and have as a major component a synthetic plastic or resinous material have heretofore been most successfully employed. Such resinous compositions are, however, generally relatively expensive and, in many instances, commence to deteriorate to some extent when they have remained on the metallic surface for a substantial period of time. Also, in many instances, the use of a solvent is required to remove the coatings from the article upon which they are used. Yet another disadvantage of many of the types of temporary coatings previously utilized to afford protection for metallic surfaces has been the requirement that such coatings be applied by a particular application technique, such as spraying or brushing. Frequently too, the coatings, when once applied in liquid form, require a relatively expensive and time-consuming curing process in order to set up to a hardened state.

The present invention comprises a new composition of matter which we have found to be highly useful as a coating material for application to metallic surfaces for the temporary protection thereof against atmospheric corrosion, abrasion and attack by corrosive liquids or other deleterious materials. The liquid composition may be easily blended, is developed from relatively inexpensive raw materials and is susceptible to application to a metallic surface by a number of simple procedures. The coating material when applied to a metallic surface does not require a curing process but merely has to be cooled in order to assume a hardened state. When it is desired to remove the coating from the metallic surface in order to utilize the metallic article which has been temporarily protected from exposure, the coating may be readily and easily stripped from the metallic surface.

Broadly, the present invention comprises an asphaltic base composition having included therein an ethylene-vinyl acetate copolymeric material and a fatty acid ester of a polyhydric alcohol. As is well known, asphalt, which constitutes the base material of the composition, is relatively inexpensive. A quantity of the ethylene-vinyl acetate copolymer ranging from about 1 to about 30 percent is blended with the asphalt, and the polyhydric alcohol ester is incorporated in the blend in an amount sufficient to make the composition readily strippable from a metallic surface to which it has been applied as a thin film or coating. The described composition may be applied to the metal surface to be protected by spraying, brushing, or dipping.

The coatings which are yielded by the composition of the invention adhere tenaciously to the metallic surface during the protective period, and yet may be easily removed from such surface by stripping them therefrom at the time when it is desired to expose the surface for further use of the metallic object. The integrity of the coating is such that no flaking nor breakdown of the strips occurs during removal of the coating, but instead, substantially the entire coating may be removed by only a few stripping movements. After removal of the coatings from the metallic surface being protected thereby, the coating material may be remelted and reapplied to other metallic surfaces to afford protection substantially equal to that afforded by the composition in its initial utilization as a coating material.

From the foregoing discussion, it will have become apparent that a broad, major object of the present invention is to provide a composition which may be easily applied to a metal surface and which affords improved protection for such surface as compared to the coating materials heretofore proposed.

A further object of the invention is to provide a composition for protectively coating metal surfaces, which composition is less expensive than many coating materials heretofore proposed.

An additional object of the present invention is to provide an improved method for protecting metallic surfaces against corrosion and abrasion.

Another object of the present invention is to provide protective coatings for metallic surfaces which can be easily, completely and quickly removed from such metallic surfaces by stripping away the coating.

An additional object of the present invention is to provide a composition which may be applied to metal surfaces as a protective coating therefor by a number of simple, rapid and inexpensive methods of application.

An additional object of the present invention is to provide a protective coating for metallic surfaces, which coating does not require a complicated or time-consuming curing technique to set up the coating to a hardened state on the metallic surface.

An additional object of the present invention is to provide a composition which may be applied to geometrically intricate metal surfaces as a smooth, continuous, uniform film, and which therefore may be applied as a protective coating of exceptional thinness.

Yet another object of the present invention is to provide a material for protectively coating metallic surfaces, which material in solid coating form is substantially impervious to gases and aqueous liquids.

Another object of the present invention is to provide a protective coating for metallic surfaces which is nontoxic and in no way injurious to the health of humans or animals.

Another object of the present invention is to provide a composition which may be utilized to coat metallic surfaces with a protective film which can be easily stripped from such metallic surfaces and the coating material then be reused by melting the stripped-off film material and reapplying the material to other metallic surfaces.

Other objects and advantages of the present invention will become apparent from a reading of the following disclosure in which our invention is described in greater detail.

As hereinbefore indicated, the present invention relates basically to a novel composition of matter which has great utility as a coating material for protecting metallic surfaces from corrosive attack and abrasion, and also to the method by which such composition is applied to such metallic surfaces as a film or coating. Considering first the composition and its method of preparation, three basic components or constituents are utilized in the composition. These materials are (a) an asphaltic material which constitutes the major component and base for the composition, (b) an ethylene-vinyl acetate copolymer and (c) a fatty acid ester of a polyhydric alcohol. (By the term "fatty acid," it is intended to include all monobasic, aliphatic acids, both saturated and unsaturated, although fatty acids containing between 6 and 22 carbon atoms are the preferred precursors of the esters utilized in the invention.) Examples of such esters include, but are not limited to, glyceryl, monolaurate, 1,3-propanediol monolaurate, ethylene glycol monostearate, glyceryl monopalmitate, acetylated glyceryl monooleate, acetylated glyceryl monolaurate, 1,2-butanediol margarate, decamethylene glycol monopalmitate, xylylene glycol monostearate, glyceryl monoricinoleate, 2,3-pentadiol monolinoleate, 2,3-butanediol, 2-methyl monolaurate, 3,5-heptanediol monopalmitoleate, glyceryl dilaurate, 1,2-butanediol isovalerate, xylylene glycol nonodecylate, and ethylene glycol monocaproate.

The amounts of the copolymer which are added to the asphaltic base are subject to considerable variation and will depend upon such widely variable parameters as the particular properties of the asphaltic base material of the composition, the particular properties of the ethylene-vinyl acetate copolymer utilized and, to some extent, the particular type of polyhydric alcohol ester which is employed. The type of metal to be coated also influences the specific blend composition adopted. It may be stated, however, that the range of copolymer concentrations which may be utilized in preparing the blends of the present invention is considerably wider from an operative standpoint than from an economic standpoint. In other words, by virtue of the current relative cost of asphaltic materials, as compared to the cost of the ethylene-vinyl acetate copolymeric material, the maximum amount of the copolymer which is incorporated in the asphalt will generally be dictated by the economic infeasibility of utilizing greater quantities of the copolymer rather than by any insufficiency or unsuitability which may characterize the coatings formed from the compositions resulting from the incorporation therein of additional or larger quantities of the copolymer. Moreover, it is rarely necessary or desirable to incorporate an amount greater than 25 percent by weight of the copolymer in the blend to impart to the coatings formed by the blend that property for which the copolymeric component is considered to be primarily responsible, i.e., continuity and integrity of the coating to permit whole or integral strips of the coating to be easily removed from the metal surface to which it has been applied. Nevertheless, the operative upper limit of the copolymer which may be used in the blend is about 50 percent by weight.

As to the minimum amount of the copolymer which we have found to be generally required in preparing the compositions of the present invention, it may be stated that, in the cases of some types of asphaltic material, as little as 1 percent of the preferred ethylene-vinyl acetate copolymers hereinafter described may be utilized in preparing the compositions.

With respect to the quantity of the fatty acid esters of polyhydric alcohols which are utilized in the compositions of the present invention, we have found that the concentration of this additive employed is also subject to considerable variation and will frequently depend as much upon the physical and chemical character of the metallic surface to which the composition is to be applied, as upon the particular asphaltic base material which is utilized. In general, a quantity of the ester constituting about 5 percent by weight of the total weight of the composition has been found to give satisfactory results. On the other hand, quantities as low as 2 percent are sometimes sufficient with petroleum-derived, vacuum-reduced or solvent precipitated asphaltic materials when the composition is to be applied as a coating to steel or ferrous-type metals.

The maxumum quantity of the ester incorporated in the blend is again subject, to some extent, to economic limitations. From the standpoint of operability, however, it is believed that as much as 10 percent of the ester may be incorporated in the composition without permitting the properties of the ester to predominate to the extent of reducing the effectiveness of suitability of the coatings which are formed from the composition.

Considering next in greater detail, the chemical nature of the materials which are added to the asphaltic base to provide the composition of the present invention, the ethylene-vinyl acetate copolymers which are employed may be broadly characterized as copolymers of ethylene and vinyl acetate having a comonomer ratio of between about 60:40 (ethylene to vinyl acetate) and about 90:10, and having a melt index of between 3 and 200. Within this broad definition of the ethylene-vinyl acetate copolymers which may be utilized, certain species have been found to perform superiorly and are therefore preferred. These preferred polymeric types are characterized by the following properties:

| | |
|---|---|
| Melt index [1] | 12 to 28 |
| Vinyl acetate, weight percent | 20 to 35 |
| Tensile strength, p.s.i.[2] | 1,000 to 2,000 |
| Elongation at break, percent [2] | 650 to 850 |
| Density at 30° C. grams/cc. | about 0.95 |
| Molecular weight | 300,000 to 400,000 |
| Brittle point, ° F. | <−70 |

[1] Grams of the copolymer which may be pressed through a standard orifice in 10 minutes at 190° C. with a piston weighing 2160 grams. (ASTM D–1238–57T).
[2] Using a sample length of 1 inch and a cross-head speed of ½ inch per minute (ASTM D–882–56T).

Excellent results have been obtained utilizing ethylene-vinyl acetate copolymers of the type sold under the trade names Elvax 150 and Elvax 250.

Of the fatty acid esters of polyhydric alcohols which may be successfully employed in preparing the blend of the present invention, we prefer to use the mono esters of glycerin, or an acetylated monoglyceride. Examples of such preferred esters are glyceryl monolaurate, glyceryl monoacetate monolaurate, glyceryl monopalmitate, glyceryl monostearate, glyceryl diacetate monopalmitate and glyceryl monooleate. The fatty acids from which the esters are derived preferably contain between 6 and 22 carbon atoms. Glyceryl monolaurate has been found to be an especially effective ester additive.

The function of the ester compounds in the composition of the present invention is to cause the films or coatings formed by the composition to be more easily released or stripped from the metal to which they are applied. The esters also function as corrosion inhibiting agents in the composition. The esters are characterized by relatively high boiling points and, because of their lack of volatility, do not vaporize from the composition over extended periods of time. The esters are also generally relatively inexpensive.

Any of the petroleum asphalts can be used in this invention. These include the straight-run asphalts, oxidized or blown asphalts, products of the deasphalting of petroleum residues of lubricating oil and asphalt origin and reconstituted or blended asphalt. Processes for producing these various asphalt are well known in the art. The straight-run asphalts are produced by steam or vacuum distillation of either naphthenic-base or intermediate-base crude oils. During the distillation, the lower, more volatile fractions of crude oil as well as considerable high-boiling material are separated off, leaving an asphalt residue of definite hardness or penetration. Blown asphalt is prepared from the asphaltic residues produced by the straight-run steam or vacuum distillation of asphaltic crude oil. Air is blown through the residues at elevated temperature causing complex chemical reactions, including polymerization of unsaturated radicals and dehydrogenation, which produce a product of higher softening point. In place of air, any of the elements of Group VI-A of the Mendelyeev's Periodic Table of the Elements, i.e., oxygen, sulfur, selenium or tellurium, may be used. In the deasphalting of petroleum residues, commonly called "propane deasphalting," the base stock is dissolved in liquified propane and heated. As the temperature rises, the solvent loses its power to keep the hydrocarbons in solution. First the highest molecular weight material, asphaltenes, precipitates out followed next by the resins and finally by the oil after the solution is heated above the critical temperature of propane. Butane, hexane, or a similar aliphatic hydrocarbon may be used in place of propane. Reconstituted or blended asphalts are produced by an extension of propane deasphalting whereby various fractions heavy in either asphaltenes, resins or oil can be blended together to form synthetic asphalts of more closely controlled properties. The most effective coatings have been prepared from compositions in which either a solvent precipitated, a blown or a vacuum-reduced, steam-refined, straight-run petroleum asphalt has been employed in concentrations of from about 65 to about 95 percent by weight.

In blending the compositions of the present invention, no special conditions are required. The copolymeric additive materials may be finely ground and stirred into the asphalt over a period of time. The esters, which may be either solid or liquid materials, are similarly dispersed in the asphalt. Preferably, the asphalt is heated to a temperature well below the point at which cracking of the asphalt or decomposition of the additive will occur. In the case of the additives of the present invention, a temperature of around 200° F. may generally be safely used. When glycerol monolaurate is the ester employed, and one of the Du Pont Elvax resins is the copolymer used, temperatures in the vicinity of 300° F. may be employed to advantage. During heating of the blend, the mixture is agitated and such agitation is continued for a sufficient period of time to assure thorough distribution of the additives throughout the asphaltic base material.

After the composition has been blended in the described manner, the metallic surface to be protected may be coated with the composition in one of several ways. For example, the composition may be sprayed upon the metal object to be coated, or it may be brushed on, or the object may be dipped into the composition to form a film thereon. The thickness of the coating which is developed upon the surface will depend upon the temperature of the composition at the time of application. By suitable temperature control, coatings of widely varying thicknesses may be applied to metal surfaces of various types. The viscosity and surface tension properties of the compositions are such that small cracks and intricate geometrical configurations in the metallic object are provided with a smooth and uniform coating, particularly when the dip coating technique is utilized.

After the hot composition has been applied to the surface to be coated, hardening of the composition is accomplished by merely permitting the liquid material to cool. Upon cooling to room temperature, the composition sets up to a hardened state and a thin continuous film which is substantially impervious to gases and aqueous liquids is formed upon the metal surface. We have found that films formed from the composition of the present invention are substantially insoluble in ordinary aqueous liquids.

In order to test the durability and ease with which the coatings produced by the process of the present invention can be removed from metal surfaces, several blends of varying copolymer and ester content were made up and were applied as a coating to steel and aluminum surfaces. Their strippability was then tested immediately following curing, and also was tested 25 days after application of the composition.

The results of several of the tests of compositions blended in accordance with the teachings of the present invention are set forth in Examples 1 and 2 hereinafter.

*Example 1*

Four asphalt base blends were made up using the components and proportions indicated in Table 1 below.

TABLE 1

| Blend | Parts By Weight | | | |
|---|---|---|---|---|
| | Asphalt | Elvax 250 | Glyceryl Monolaurate (Commercial grade) | Myvacet 5-00 |
| A | 80 | 20 | 5 | |
| B | 80 | 20 | | 5 |
| C | 85 | 15 | 5 | |
| | | Elvax 150 | | |
| D | 80 | 20 | 5 | |

The asphaltic base material was a vacuum-reduced, steam-refined, straight run petroleum asphalt having the following properties:

Softening point, (ring and ball). ° F. _____ 111
Penetration, 32° F., 200 grams, 60 seconds ____ 20
Penetration, 77° F., 100 grams, 5 seconds _____ 93
Ductility, 77° F., 5 centimeters/minute, centimeters _____ 150+
Flash, C.O.C., ° F. _____ 585

The Elvax 150 and Elvax 250 are ethylene-vinyl acetate copolymers sold under these tradenames and are characterized by the following properties:

| Copolymer | Elvax 150 | Elvax 250 |
|---|---|---|
| Comonomer ratio, wt. percent (ethylene:vinyl acetate) | 66:34 to 68:32 | 73:27 to 71:29 |
| Melt index (ASTM D-1238-57T) | 22 to 28 | 12 to 18 |
| Refractive index, $N_D^{25}$ | 1.484-1.487 | 1.481-1.484 |
| Density at 30° C., grams/cc | 0.95 | 0.95 |
| Softening point (ring and ball), ° F. | 243 | 276 |
| Inherent viscosity at 30° C.[1] | 0.77 | 0.85 |
| Molecular weight | 300,000 | 400,000 |
| Tensile strength, p.s.i.[2] | 1,000 | 2,000 |
| Elongation at break, percent [2] | 700 | 750 |

[1] Determined using a solution of 0.25 percent by weight of the copolymer in toluene.
[2] Crosshead speed of ½-inch per minute and a sample length of 1-inch (ASTM D-882-56T).

The Myvacets are prepared by the action of acetic anhydride upon mixtures of monoglycerides from lard fat. The solid grades are described as waxy, flexible fats which retain plasticity when cooled to very low temperatures. Myvacet 5-00, the highest melting grade, is a distilled monoglyceride from hydrogenated lard in which about one half the free hydroxyl groups have been acetylated. Myvacet 5-00 has the following typical properties:

| | |
|---|---|
| Melting point, ° F. | 106–109 |
| Clear point, ° F. | 131 |
| Viscosity, cps. at 50° C. | 30 |
| Saponification No. | 296 |
| Percent monoglyceride | 14 |

In making up the blends, the asphaltic base material was first warmed to lower its viscosity and permit free agitation for blending in the additives. The Elvax copolymers were then added to the asphaltic base in the specified proportions, followed by addition of the ester material.

The blends so prepared and described in Table 1 above were next heated to a temperature calculated to produce a coating of 0.06 to 0.08 inch when applied to a flat metallic surface. In the case of the blends containing the Elvax 250 copolymer, this temperature was 220° F., whereas in the case of the blend containing Elvax 150, the temperature calculated to yield a coating of this thickness was 190° F. After bringing the blends to the indicated temperatures, two coupons of steel and two coupons of aluminum metal were each dip coated with the hot blends. The coupons were then cooled to a temperature of about 70° F. and the coating on one of the coupons of each metal was then tested by lifting one edge of the coating with a knife blade and attempting to strip it from the metal by pulling the free edge. The second coupon of each metal was allowed to stand in coated condition for 25 days. After this period of time, the described stripping test was conducted to ascertain the ease with which the coating might be stripped from the metal after a period of aging. The results of these stripping tests are tabulated in Table 2.

TABLE 2

| Blend | Release From Metal Surface | | | |
|---|---|---|---|---|
| | Immediate | | After 25 Days | |
| | Steel | Aluminum | Steel | Aluminum |
| A | Fair | Fair | Fair | Fair. |
| B | do | do | Poor | Poor. |
| C | do | do | do | Do. |
| D | Poor | do | do | Do. |

From the results tabulated in Table 2, it will be perceived that the best results were obtained from the blend designated Blend A and containing 20 parts by weight of Elvax 250 and 5 parts by weight of the glyceryl monolaurate ester. In the case of the other blends, the releasibility of the coating from both the steel and aluminum after 25 days was poor, although the releasibility from both the steel and aluminum immediately following hardening of the coating was fair with the exception of the Elvax 150 blend which did not release well from the steel coupon. In the above tests "Poor" release indicates that the coating bonded to the metal and would not separate cleanly. "Fair" release indicates that the coating can be pulled cleanly from the metal by moderately strong pull on the edge which has been pried from the metal.

*Example 2*

A number of compositions were blended according to the process of the present invention as described in Example 1, but using a propane precipitated asphalt having the following properties:

| | |
|---|---|
| Softening point (ring and ball), ° F. | 153 |
| Penetration, 32° F., 200 grams, 60 seconds | 7 |
| Penetration, 77° F., 100 grams, 5 seconds | 15 |
| Ductility, 77° F., 5 cm./min., cm. | 31 |
| Flash, C.O.C., ° F. | 545 |

The compositions of the blends which were made up using the asphalt are set forth in Table 3.

TABLE 3

| Blend | Parts by Weight | | | |
|---|---|---|---|---|
| | Asphalt | Elvax 250 | Glyceryl Monolaurate | Myvacet 5-00 |
| E | 85 | 15 | 5 | |
| F | 80 | 20 | 5 | |
| G | 85 | 15 | | 5 |
| H | 80 | 20 | | 5 |
| | | Elvax 150 | | |
| J | 85 | 15 | 5 | |
| K | 80 | 20 | 5 | |
| L | 85 | 15 | | 5 |
| M | 80 | 20 | | 5 |

Again, two steel and two aluminum coupons were coated with each of the blends, although in this instance, the Elvax 250 blends were warmed to 275° F. in order to provide a coating or from about 0.06 to 0.08 inch, whereas the Elvax 150 blends were warmed to 260° F. in order to provide a coating of the same thickness. Immediate and 24–day strippability tests were conducted on the steel and aluminum coupons coated with the blends set forth in Table 3 in the same manner as that described in Example 1 above. The results of these stripping tests are set forth in Table 4.

TABLE 4

| Blend | Release From Metal Surface | | | |
|---|---|---|---|---|
| | Immediate | | After 24 Days | |
| | Steel | Aluminum | Steel | Aluminum |
| E | Good | Good | Good | Good. |
| F | do | do | do | Do. |
| G | do | Fair | do | Poor. |
| H | do | do | do | Do. |
| J | do | Good | Poor | Do. |
| K | do | do | Good | Do. |
| L | Poor | Poor | | |
| M | do | do | | |

The results tabulated in Table 4 show that the asphaltic material employed in Example 2 is a superior base material to the type of asphalt used in Example 1. Moreover, the results of Table 4 support the conclusion derived from the results set forth in Table 2 of Example 1 that the acetylated monoglyceride ester is not as effective a releasing agent as is the glyceryl monolaurate ester. The results in Table 4 also confirm the fact that Elvax 150 is, in general, slightly less effective than the Elvax 250 copolymer. In the above tests "Poor" and "Fair" ratings are the same as described above for Table 2. "Good" differs from "Fair" in that less pull is required to strip the coating from the metal surface.

Although certain exemplary embodiments of the invention have been hereinbefore set forth, it is expected that a number of minor modifications and changes in the concentrations of additives utilized, conditions of blending employed, and molecular constitutions of the additives within the broad definitions hereinbefore prescribed will be apparent and will be resorted to by those skilled in the art to meet the needs of a particular asphaltic or bituminous base material, or the particular conditions of use of the compositions of the invention. However, insofar as such modifications and changes continue to rely upon the basic inventive principles herein disclosed, it is intended that such innovations be circumscribed by the spirit and scope of the present invention, except as the same may be necessarily limited by the appended claims.

We claim:

1. A composition of matter comprising a mixture of 100 parts by weight petroleum asphalt, 1 to 50 parts by weight ethylene-vinyl acetate copolymer having an ethylene-to-vinyl acetate ratio between about 60:40 and about 90:10, and a melt index of 3 to 300, and 2 to 10 parts by weight of a fatty acid partial ester of a polyhydric alcohol.

2. The composition of claim 1 wherein the petroleum asphalt is a vacuum-reduced, straight run asphalt.

3. The composition of claim 1 wherein the petroleum asphalt is a blown asphalt.

4. The composition of claim 1 wherein the petroleum asphalt is a solvent precipitated asphalt.

5. The composition of claim 4 wherein the solvent precipitated asphalt is a propane precipitated asphalt having the following properties:

| | |
|---|---|
| Softening point (ring and ball), ° F. | 153 |
| Penetration, 32° F., 200 grams, 60 seconds | 7 |
| Penetration, 77° F., 100 grams, 5 seconds | 15 |
| Ductility, 77° F., 5 cm./min., cm. | 31 |
| Flash, C.O.C., ° F. | 545 |

6. The composition of claim 1 wherein the ethylene-vinyl acetate copolymer has the following properties:

| | |
|---|---|
| Melt index | 12 to 28 |
| Vinyl acetate, weight percent | 20 to 35 |
| Tensile strength, p.s.i. | 1000 to 2000 |
| Elongation at break, percent | 650 to 850 |
| Density at 30° C., grams/cc. | About 0.95 |
| Molecular weight | 300,000 to 400,000 |
| Brittle point, ° F. | $<-70$ |

7. The composition of claim 1 wherein the partial ester of the polyhydric alcohol is a partial ester of glycerin.

8. The composition of claim 7 wherein the ester is glyceryl monolaurate.

9. The composition of claim 7 wherein the ester is a partially acetylated monoglyceride.

10. A composition of matter for protecting a metal surface against corrosion comprising:
   (a) 100 parts by weight of a propane precipitated asphalt,
   (b) 1 to 50 parts by weight of a copolymer of ethylene and vinyl acetate having the following properties:

| | |
|---|---|
| Monomer ratio, wt. percent (ethylene to vinyl acetate) | 73:27 to 71:29 |
| Melt index | 12 to 18 |
| Refractive index, $N_D^{25}$ | 1.482 |
| Density at 30° C., grams/cc. | 0.95 |
| Softening point (ring and ball) ° F. | 276 |
| Inherent viscosity, at 30° C. | 0.85 |
| Molecular weight | 400,000 |
| Tensile strength, p.s.i. | 2,000 |
| Elongation at break, percent | 700 | and
   (c) 2 to 10 parts by weight of a polyhydric alcohol partial ester.

11. The method of preparing a composition of matter for protectively covering metallic surfaces with a strippable coating comprising adding to an asphaltic material
   (a) at least 1 percent by weight of an ethylene-vinyl acetate copolymer having an ethylene-to-vinyl acetate ratio of between about 60:40 and about 90:10 and a melt index of between 3 and 200, and
   (b) an amount of a polyhydric aliphatic alcohol fatty acid partial ester sufficient to permit said coating to be easily stripped from the metallic surface to which it is applied.

12. The method of protecting a metallic surface against corrosion which comprises applying to said metallic surface a coating of a composition comprising a petroleum asphalt having incorporated therein
   (a) at least 1 percent by weight of an ethylene-vinyl acetate copolymer having an ethylene-to-vinyl acetate ratio of between about 60:40 and about 90:10 and a melt index of between 3 and 200, and
   (b) an amount of a polyhydric aliphatic alcohol fatty acid partial ester sufficient to permit said coating to be easily stripped from the metallic surface to which it is applied.

13. The method claimed in claim 12 wherein said coating is applied by
   (a) heating said composition to a temperature sufficient to permit a coating of the desired thickness to be applied to the metallic surface; and
   (b) dipping the metal bearing said surface into said heated composition.

14. The method claimed in claim 12 wherein the ester component of said composition is glyceryl monolaurate.

15. The method claimed in claim 12 wherein said composition comprises about 80 parts by weight of a petroleum asphalt, from about 10 to about 25 parts by weight of an ethylene-vinyl acetate copolymer having the following properties:

| | |
|---|---|
| Melt index | 12 to 28 |
| Vinyl acetate, wt. percent | 20 to 35 |
| Tensile strength, p.s.i. | 1000 to 2000 |
| Elongation at break, percent | 650 to 850 |
| Density at 30° C., grams/cc. | About 0.95 |
| Molecular weight | 300,000 to 400,000 |
| Brittle point, ° F. | $<-70$ | and from about 2 to 10 parts by weight of glyceryl monolaurate.

References Cited by the Examiner

UNITED STATES PATENTS

| | | | |
|---|---|---|---|
| 2,408,297 | 9/1946 | Cubberley et al. | 260—28.5 |
| 2,475,699 | 7/1949 | Derksen | 260—28.5 |
| 2,486,487 | 11/1949 | Lowden | 260—28.5 |
| 2,549,050 | 4/1951 | Brophy et al. | 260—23 |
| 2,680,254 | 6/1954 | Oppenheim | 260—23 |
| 2,790,732 | 4/1957 | McGarry et al. | 260—887 |
| 3,057,810 | 10/1962 | Guillet et al. | 260—23 |
| 3,061,569 | 10/1962 | Stoner et al. | 260—33.4 |

OTHER REFERENCES

Kirk et al., "The Encyclopedia of Chemical Technology," vol. 7 (1951), page 227.

LEON J. BERCOVITZ, *Primary Examiner.*

R. A. WHITE, *Assistant Examiner.*